Figure 1:
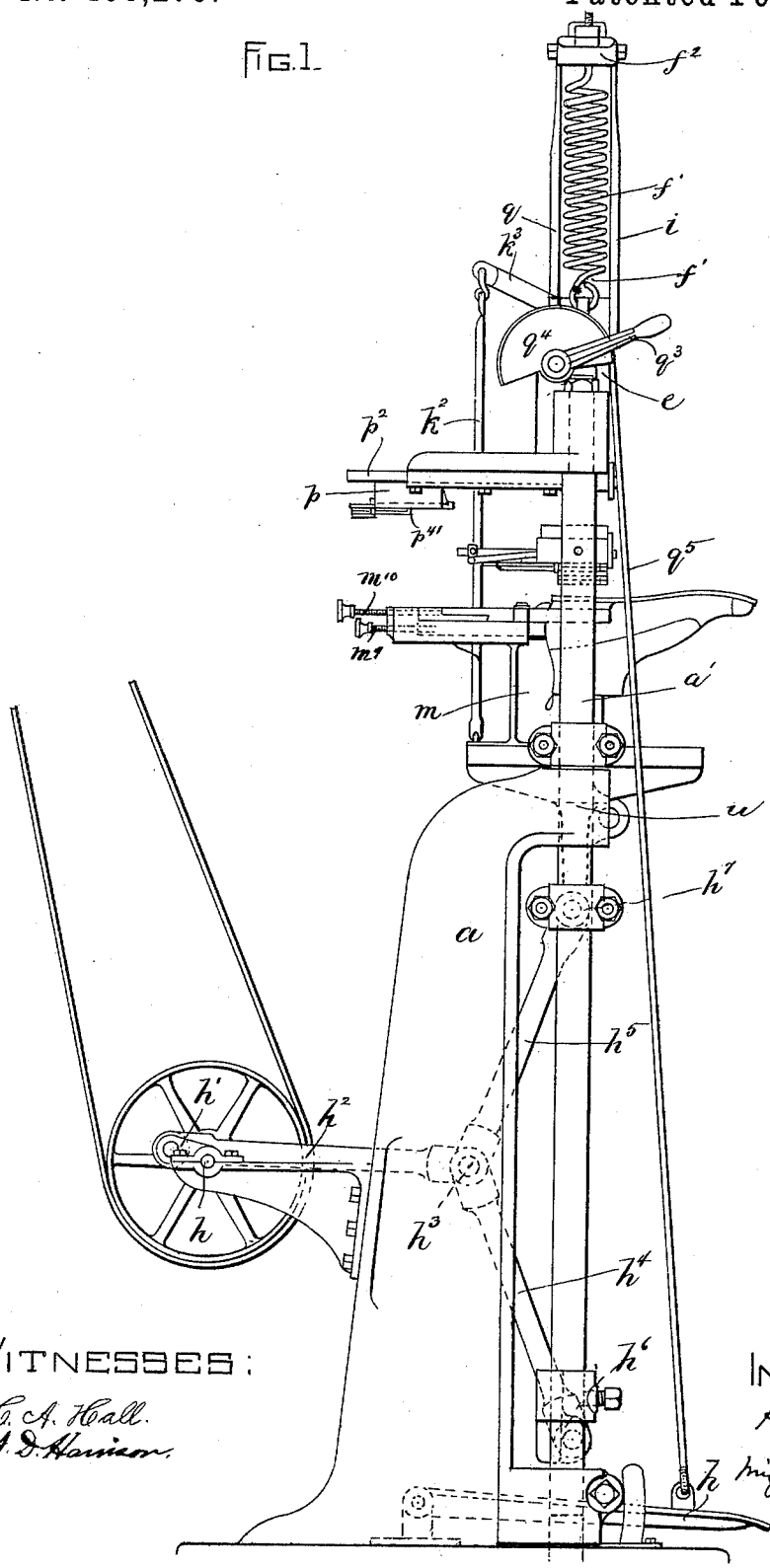

(No Model.) 9 Sheets—Sheet 4.

H. A. WEBSTER.
HEEL NAILING MACHINE.

No. 468,279. Patented Feb. 2, 1892.

Witnesses:
H. A. Hall.
A. J. Harrison.

Inventor
H. A. Webster
by Wright Brown Crosley
Attys.

(No Model.) 9 Sheets—Sheet 5.
H. A. WEBSTER.
HEEL NAILING MACHINE.
No. 468,279. Patented Feb. 2, 1892.
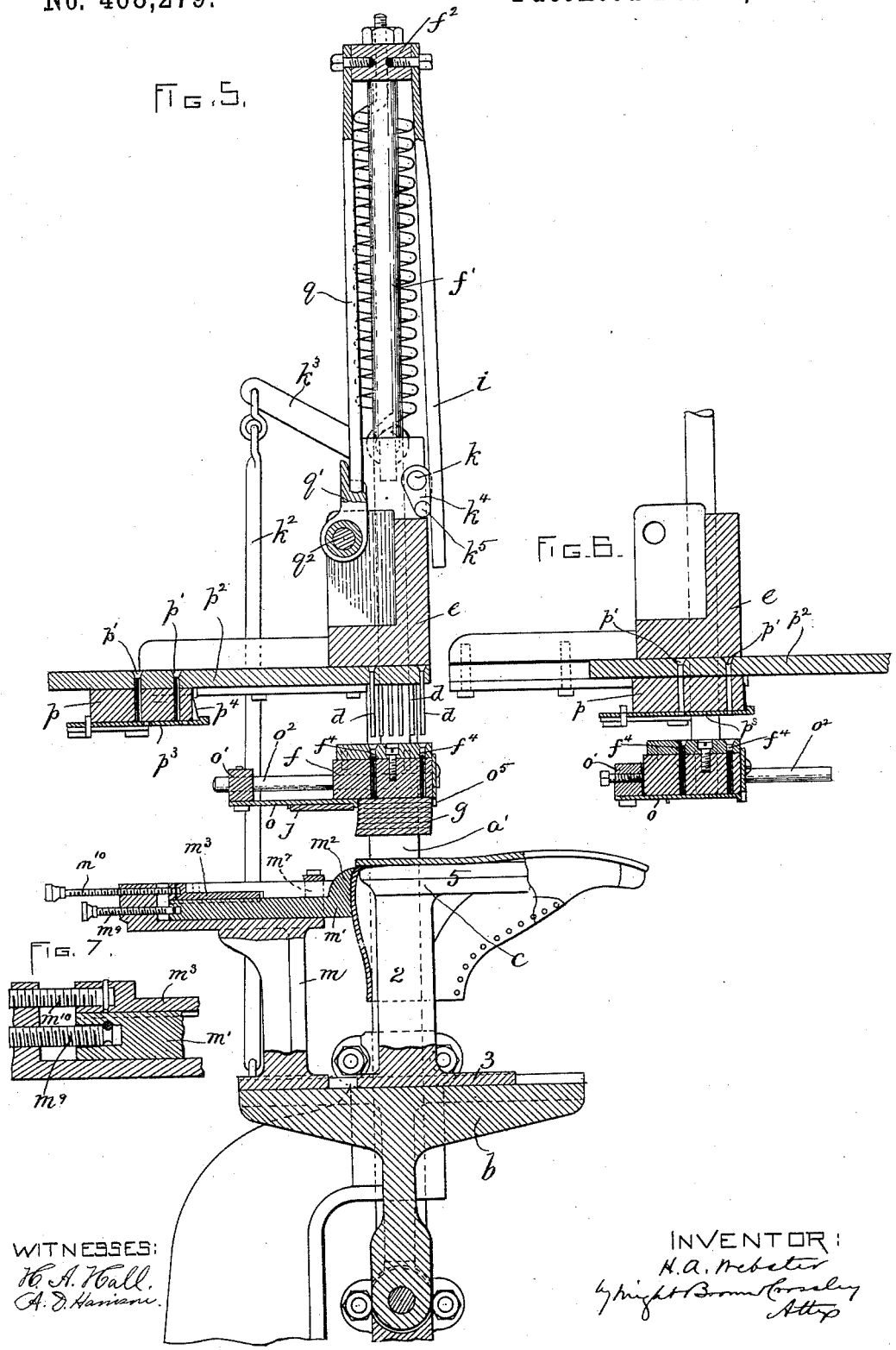
WITNESSES:
H. A. Hall.
A. D. Harmon.
INVENTOR:
H. A. Webster
by Wright Brown Quimby
Attys

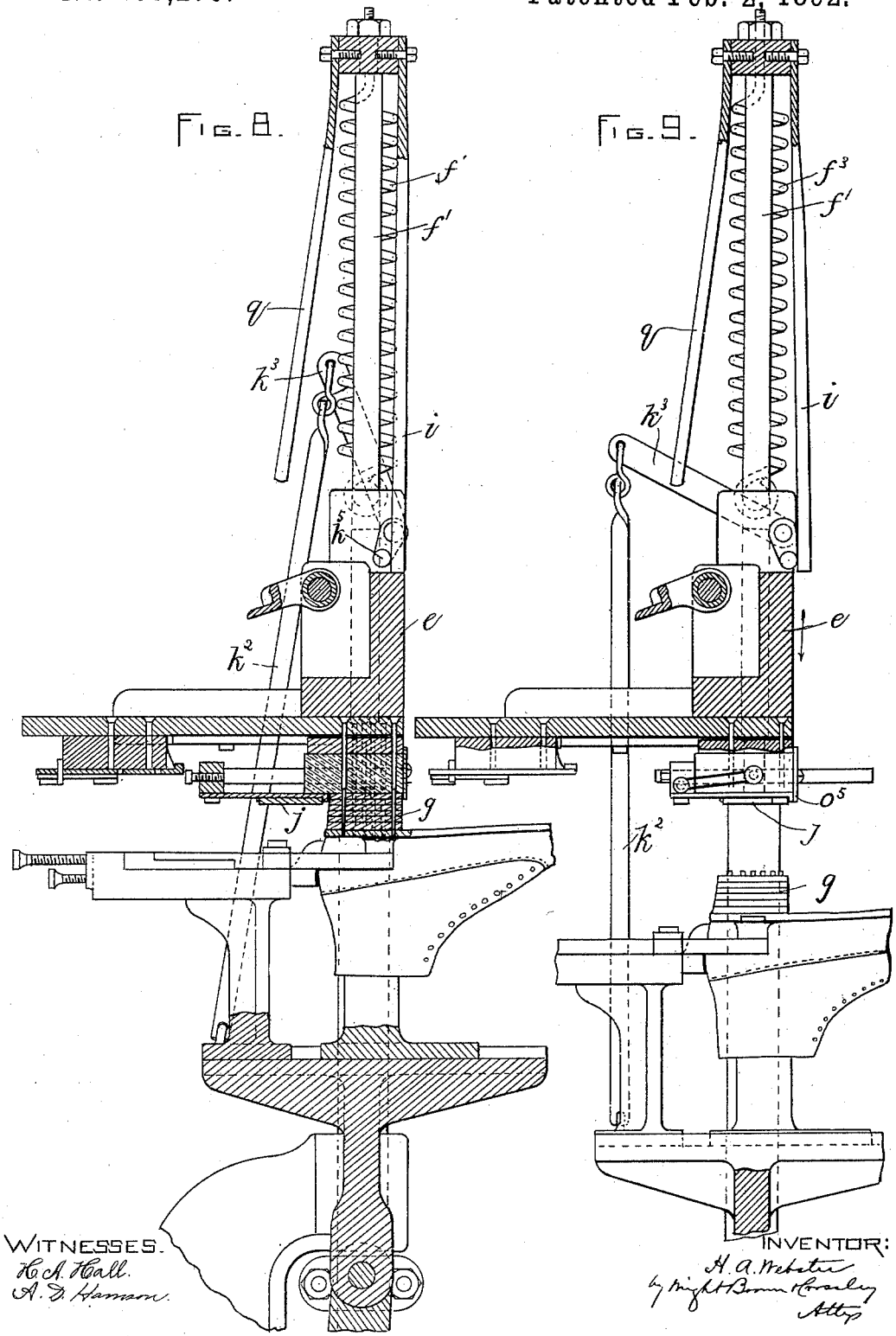

(No Model.) 9 Sheets—Sheet 7.
H. A. WEBSTER.
HEEL NAILING MACHINE.
No. 468,279. Patented Feb. 2, 1892.
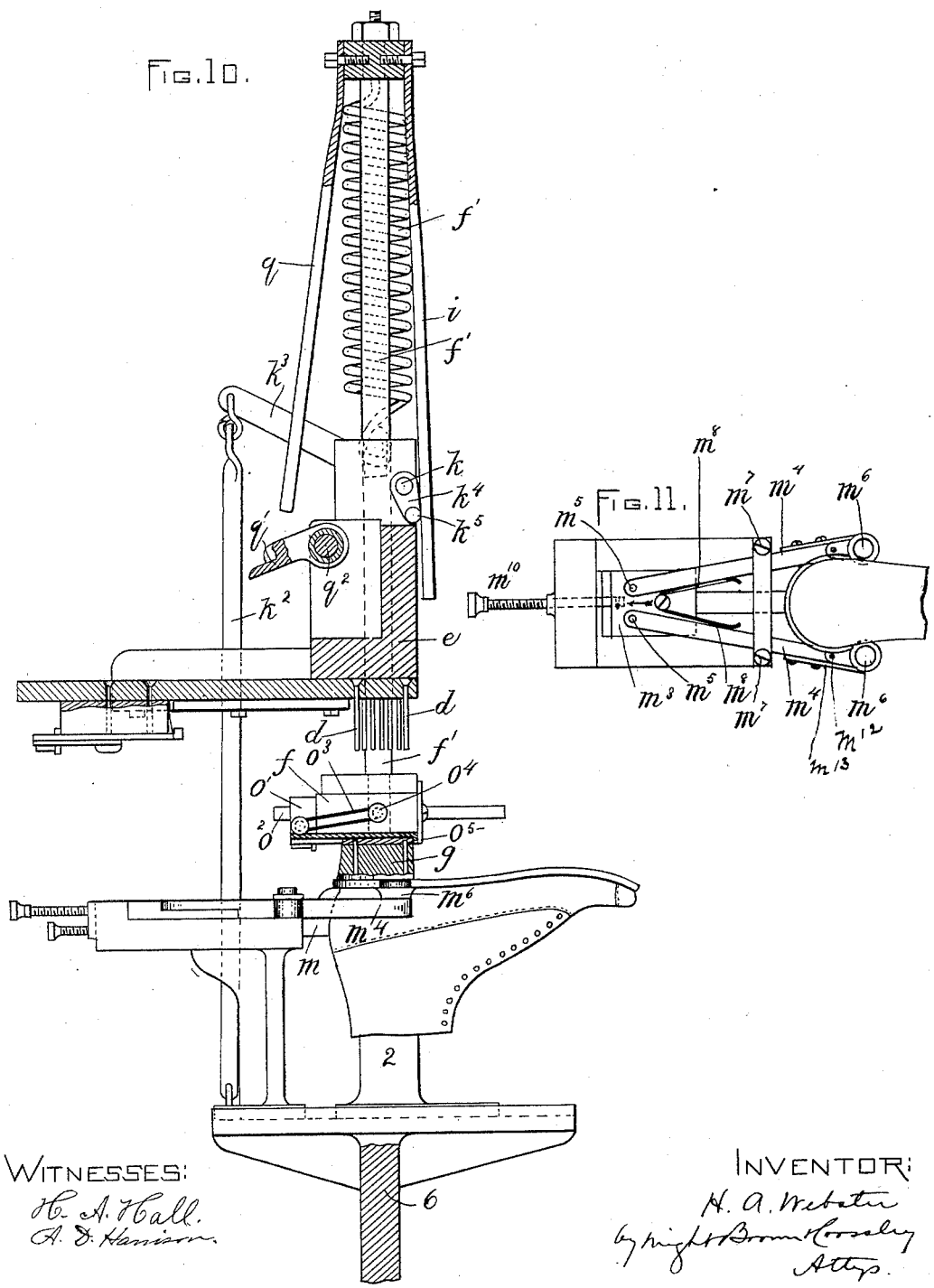
WITNESSES:
H. A. Hall.
A. D. Harrison.
INVENTOR:
H. A. Webster
by Wright Brown Crossley
Attys.

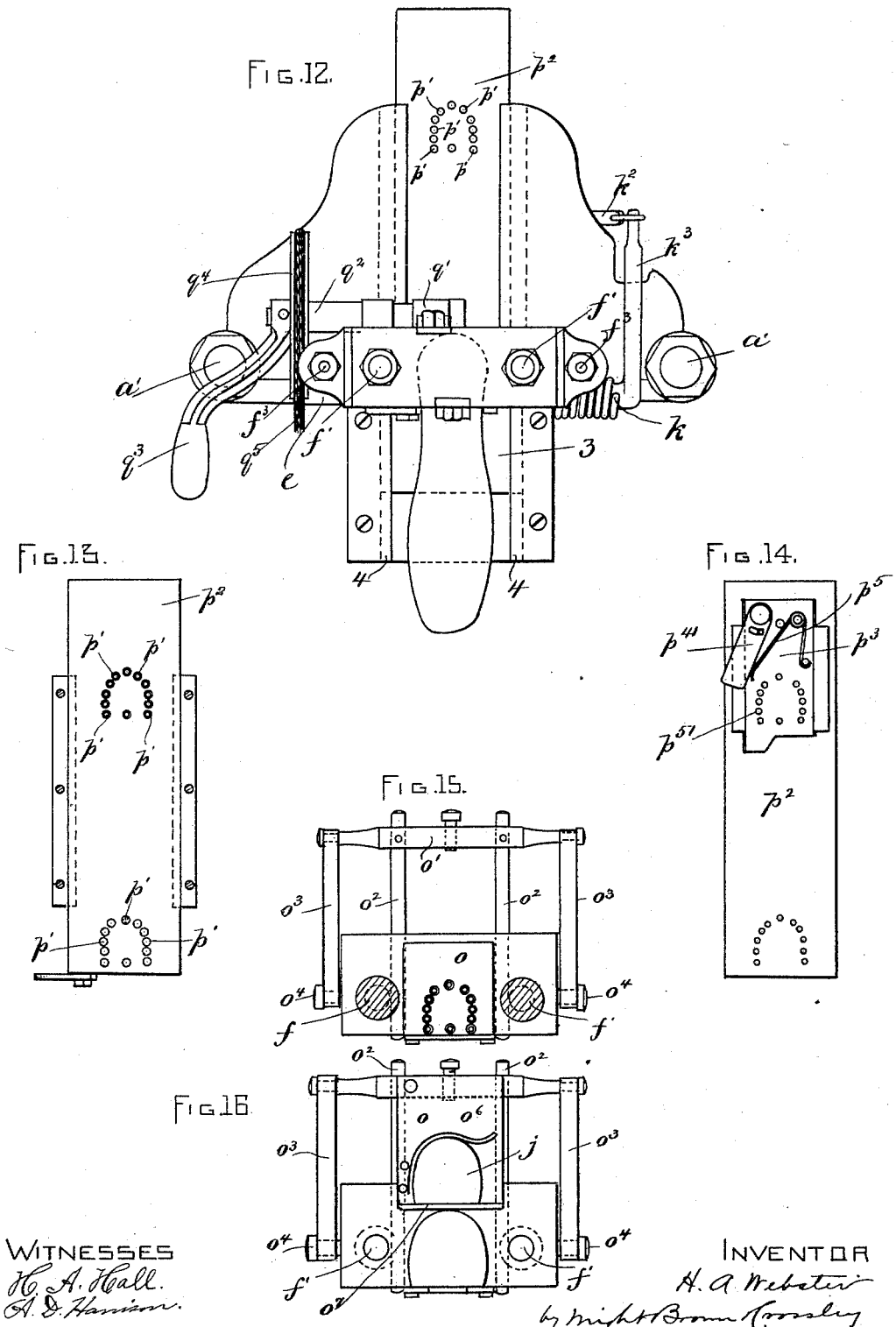

(No Model.) 9 Sheets—Sheet 9.
H. A. WEBSTER.
HEEL NAILING MACHINE.

No. 468,279. Patented Feb. 2, 1892.

UNITED STATES PATENT OFFICE.

HAROLD A. WEBSTER, OF HAVERHILL, ASSIGNOR TO JAMES W. BROOKS, TRUSTEE, OF CAMBRIDGE, MASSACHUSETTS.

HEEL-NAILING MACHINE.

SPECIFICATION forming part of Letters Patent No. 468,279, dated February 2, 1892.

Application filed October 12, 1891. Serial No. 408,441. (No model.)

*To all whom it may concern:*

Be it known that I, HAROLD A. WEBSTER, of Haverhill, in the county of Essex and State of Massachusetts, have invented certain new and useful Improvements in Heel-Nailing Machines, of which the following is a specification.

This invention has for its object to enable a heel to be attached to a boot or shoe and a top lift to be blind-nailed to the heel during a cycle of movements of the machine caused by one complete operation of the actuating device—that is to say, by one complete rotation of the driving-shaft of a power-operated machine or by the depression of a treadle in a foot-power machine—the aim of the invention being to reduce to the minimum the time required to perform the successive operations of forcing a charge of nails into a heel and the heel-seat of a shoe, applying a top lift to the heel thus attached, and spanking on the top lift.

The invention consists, first, in a group or series of elements comprising a nail-securing templet, a heel-holder adapted to sustain a heel in operative relation to the templet, a top-lift holder and spanker which is interchangeable in position with a heel held by said heel-holder, a shoe-support, and a gang of drivers located at opposite sides of the point occupied successively by the heel and top lift and in line with said point, combined with operating mechanism adapted to impart a cycle of movements to the movable members of said group, whereby, first, the heel-seat of a shoe is brought in contact with a heel held on the templet by the heel-holder and the nails are forced from the templet into the heel and heel-seat; secondly, the attached heel and templet are separated to permit the top-lift spanker to be moved to the position formerly occupied by the heel, and, thirdly, the top-lift spanker and shoe-support are caused to co-operate in affixing the top lift to the heel.

The invention also consists in the several improvements in an organized machine for attaching heels and top lifts in the manner above indicated, all of which I will now proceed to describe and claim.

Figure 2:
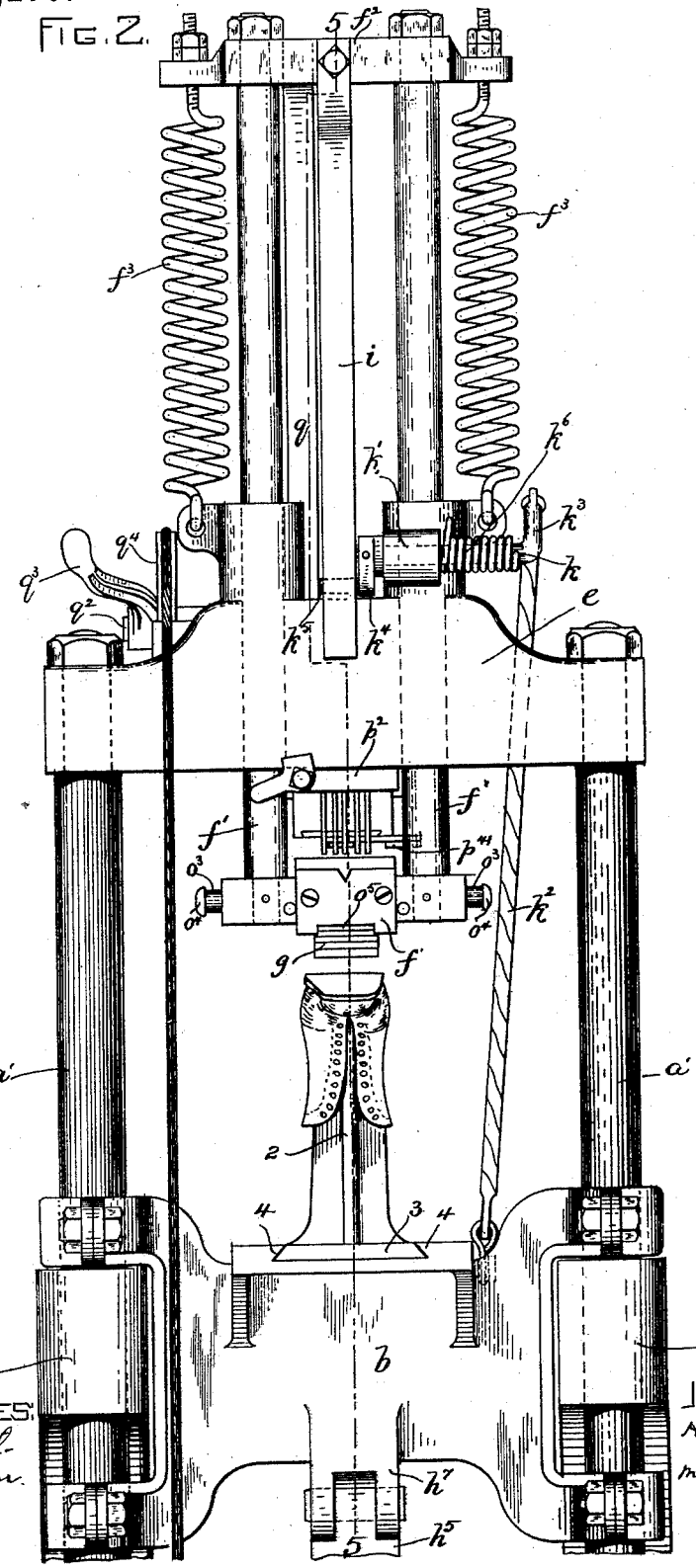
Figure 3:
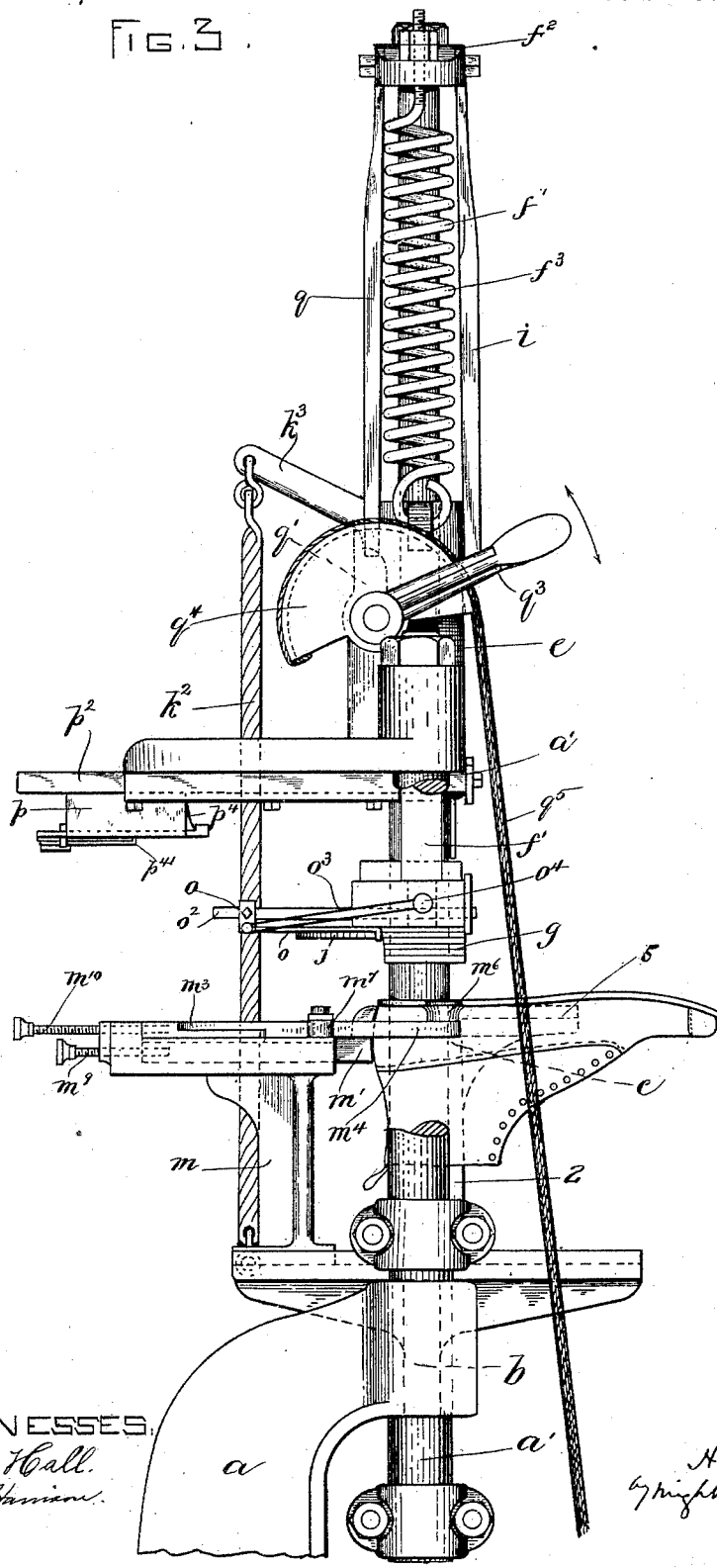
Figure 4:
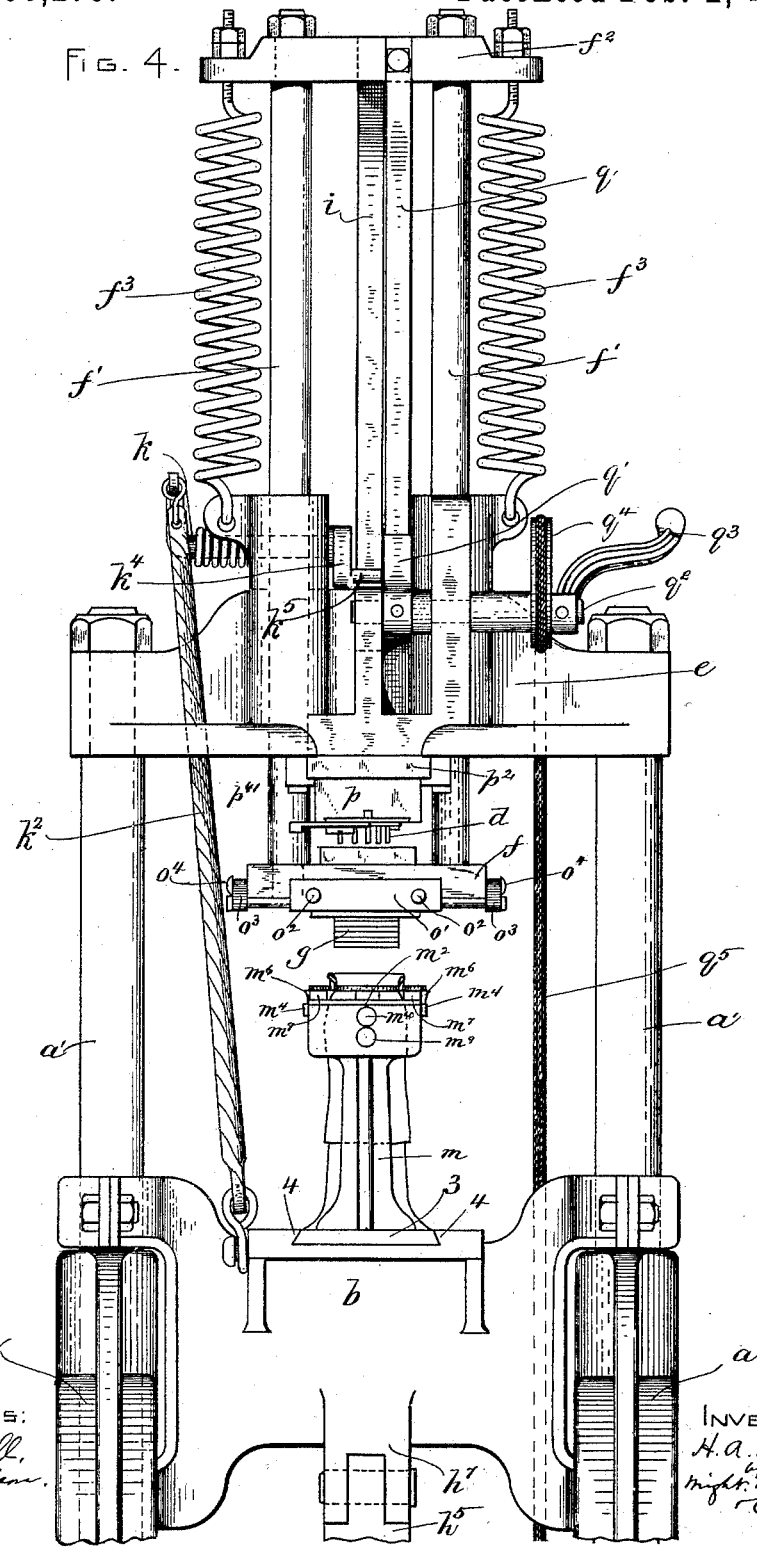
Figure 17:
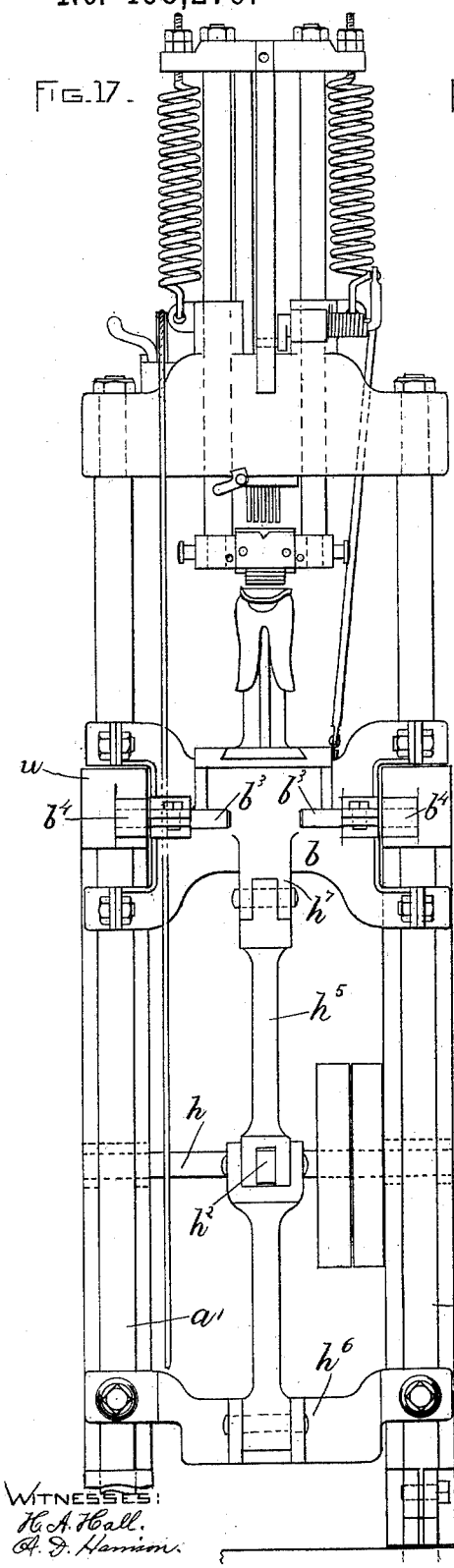
Figure 18:
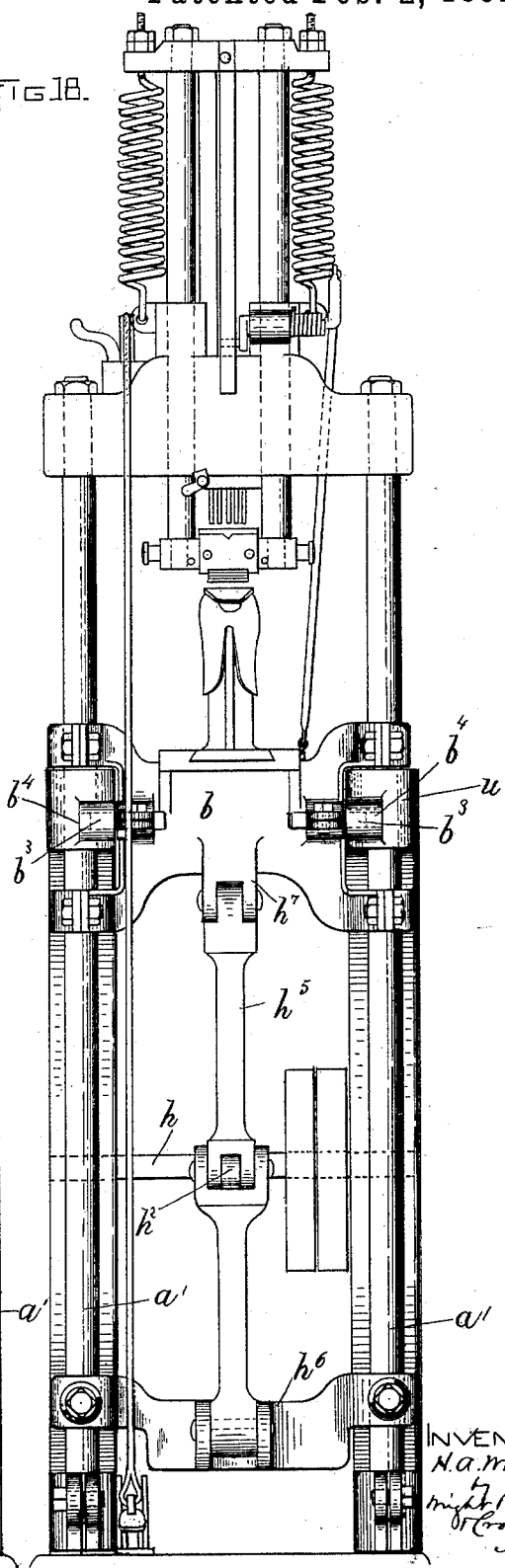

In the accompanying drawings, forming a part of this specification, Figure 1 represents a side elevation of a heel-nailing machine embodying one form of my invention organized to be operated by foot-power. Fig. 2 represents a front elevation of the machine, the lower portion of the supporting-frame and a portion of the foot-power mechanism being broken away. Fig. 3 represents a side elevation of the construction shown in Fig. 2. Fig. 4 represents a rear elevation of the construction shown in Fig. 2. Fig. 5 represents a section on line 5 5 of Fig. 2, showing the position of the parts just before the operation of attaching the heel to a boot or shoe. Fig. 6 represents a sectional view of parts shown in Fig. 5, but in different relative positions. Fig. 7 represents an enlargement of a part of Fig. 5. Figs. 8, 9, and 10 represent sectional views showing the machine under different conditions. Fig. 11 represents a top view of the shoe-centering device. Fig. 12 represents a top view of the machine shown in the preceding figures. Fig. 13 represents a top view of the slide and the nail-loading block and drivers thereon. Fig. 14 represents a bottom view of the same. Fig. 15 represents a top view of the templet. Fig. 16 represents a bottom view of the templet, showing the heel-holder and the top-lift holder and spanker. Figs. 17 and 18 represent front views of the machine, showing means for adjusting or adapting either the drivers or the shoe-support to move and operate the templet.

The same letters and numerals of reference indicate the same parts in all the figures.

I will first describe the invention with reference to Figs. 1 to 15, inclusive.

In the drawings, $a$ represents a supporting-frame, which may be of any suitable construction and is provided with parallel guide-rods $a'$ $a'$.

$b$ represents a cross-head fitted to slide upon said guide-rods and carrying a support $c$ for a boot or shoe, said support being here shown as composed of a standard 2, formed on a slide 3, which is fitted to move horizontally between dovetail guides 4 4 on the cross-head $b$ and an arm or last-shaped piece 5, affixed to the upper end of the standard 2 and formed to bear against the inner surface of the sole of a boot or shoe placed on the support.

$d\ d\ d$ represent a gang of drivers which are located on a head $e$, supported by and attached to the guide-rods $a'\ a'$.

$f$ represents a movable nail-holding templet interposed between the drivers $d$ and support $c$, said templet being movable in the same direction as the support and guided in its movements by rods $f'\ f'$, affixed at their lower ends to the templet and passing through guides in the fixed head $e$. The upper ends of the rods $f'$ are connected by a bar or yoke $f^2$, to which are connected the upper ends of springs $f^3$, the lower ends of which are secured to ears or supports affixed to the head $e$, the object of said springs being to give the templet a yielding blow against a top lift and heel interposed between it and the support $c$, as hereinafter described, the springs permitting the templet to be raised by the support $c$.

The templet $f$ is provided with nail-receiving holes $f^4$, arranged to coincide with the drivers $d$, so that when the templet is forced toward the drivers by the support $c$, as hereinafter described, the drivers will enter the nail-holes and eject the nails therefrom, forcing said nails into the heel $g$, as shown in Fig. 8. The nails are thus caused to attach the heel to the heel-seat portion of the shoe, the outer portions or heads of the nails being left projecting from the heel to enable the top lift to be secured by blind-nailing.

Means are provided for forcing the support $c$ toward the drivers, said movement of the support causing the templet and the heel $g$, previously interposed between the templet and support, to move toward the drivers with the result above indicated. I have shown in Fig. 1 as the means for moving the support $c$ a shaft $h$, journaled in bearings on the supporting-frame and bearing a crank $h'$, which is connected by a rod $h^2$ with the meeting ends of toggle-links $h^4\ h^5$. The link $h^4$ is connected with a cross-bar $h^6$, affixed to the guide-rods $a'\ a'$, and the link $h^5$ is connected with ears $h^7$ on the cross-head $b$, the arrangement being such that when the shaft $h$ is rotated to one position the toggle-links will be thrown into alignment and caused to raise the cross-head and the shoe-support $c$. When the shaft reaches another position, the toggle-links are thrown out of alignment and permit the depression of the cross-head and shoe-support. When the support $c$ is at rest in the position farthest removed from the drivers, a heel $g$ is interposed between the under side of the templet and the heel-seat portion of a shoe placed on the support $c$, and the holes in the templet are supplied with nails. The support is then moved toward the drivers by the depression of the treadle, this movement causing the heel-seat portion of the shoe to bear upon the heel and the heel and templet to move, with the shoe and support, toward the drivers, the latter being thus caused to force the nails from the templet into the heel and into the heel-seat portion of the shoe, as shown in Fig. 8, the length of the drivers being such that they do not drive the nails entirely into the heel, but leave the outer ends of the nails projecting. The described movement of the templet compresses the operating-springs $f^3$ thereof, so that the templet is set for the operation of spanking on a top lift and solidifying the heel, which operation takes place after the support $c$, with the boot or shoe and the heel attached thereto, have commenced their movement in the opposite direction, so that the heel has been separated from the templet.

In order to afford time for the separation of the attached heel from the templet and the interposition of the top lift between the templet and heel, I provide a latch or detent which arrests the templet in the position to which it was moved by the heel-attaching movement of the support $c$. Said latch or detent is here shown as a spring-arm $i$, attached at one end to the cross-bar $f^2$, its other end being free and adapted to normally spring inward and engage the upper edge of the fixed head $e$, as shown in Fig. 8, when the templet has been raised to a sufficient height, said arm by its engagement with the head $e$ preventing the descent of the templet with the support $c$. The support $c$ commences to descend upon the release of the treadle by the operator, the shoe and the attached heel descending with it, thus separating the heel from the templet, as shown in Fig. 9. A top lift $j$ is now interposed between the templet and the heel, as shown in Fig. 9, the top-lift being preferably moved into place by the automatic means presently described and the latch or detent $i$ is afterward displaced, as shown in Fig. 9, thus releasing the templet and allowing the springs $f^3$ to force it against the top lift and spank the latter onto the projecting ends of the nails in the heel $g$, the templet at the same time solidifying the heel by pressing the lifts thereof together. The detent $i$ may be displaced by any suitable means, preferably by automatic devices such as are shown in the drawings, said devices comprising a rock-shaft $k$, journaled in an ear or bearing $k'$, affixed to the head $e$, a rod or strap $k^2$, connecting an arm $k^3$ with the cross-head $b$, and an arm $k^4$ on said rock-shaft, having a stud $k^5$ arranged to bear against the inner side of the detent $i$. When the cross-bar $b$ is raised, as shown in Fig. 8, a spring $k^6$ on the rock-shaft $k$ turns the latter so as to move the stud $k^5$ inwardly and thus permit the detent $i$ to engage the upper edge of the head $e$, as shown in Fig. 8. When the cross-head $b$ is depressed, the rod $k^2$ turns the rock-shaft so as to throw the stud $k^5$ outwardly, as shown in Figs. 5 and 9, thus depressing the detent $i$.

It will be observed that all the movements required to affix the heel to the shoe and to spank on the top lift and solidify the heel constitute one cycle of the movements making up a complete operation of the machine and are the result of a single complete movement of the operating device, which in this form of machine (shown in Fig. 1) is a treadle, the heel-attaching movement of the support $c$ and the elevation and locking of the templet taking place during one-half of a complete rotation of the shaft $h$, while the separation of the heel from the templet, the insertion of the top lift between the templet and heel, and the release and spanking movement of the templet take place during the concluding portion of said rotation. It is obvious that the same result would take place if the machine were operated by a treadle arranged to raise and then release the cross-head carrying the shoe-support. Hence the invention is not limited to a power-operated machine. It will be observed that the yielding blow given by the templet in spanking on the top lift and solidifying the heel prevents the crushing of the last and enables the shoe to be held, if desired, upon a wooden last, in which case the support $c$ would be adapted to sustain a last instead of being formed to enter the interior of the shoe.

For holding the shoe on the support $c$ I have provided a holding and centering device, consisting of a standard $m$, affixed to the cross-head $b$ at the rear of the support $c$, a slide $m'$, supported by horizontal guides formed on said standard and movable toward and from the support $c$, one end of said slide being provided with a head $m^2$, formed to fit the heel portion of the upper of a shoe on the support $c$ along the median line of the upper, a slide $m^3$, fitted to slide upon the slide $m'$, and two levers $m^4$ $m^4$, Fig. 11, pivoted at $m^5$ $m^5$ to the slide $m^3$ and provided at their swinging ends with projections $m^6$, formed to bear upon the opposite sides of the upper of a boot or shoe, preferably about in line with the position occupied by the breast of the heel, one of said projections being at one side of the heel and the other at the opposite side. The upper edges of the levers $m^4$ $m^4$ bear against studs or supports $m^7$, affixed to the standard $m$, said supports causing the projections $m^6$ to move toward each other and grasp a shoe-upper interposed between them, when the slide $m^3$ is moved in the direction indicated by the arrow in Fig. 11. The levers $m^4$ are yieldingly pressed outwardly against the supports $m^7$ by springs $m^8$.

$m^9$ represents an adjusting-screw engaged with a threaded socket affixed to the standard $m$ and having an unthreaded end, which is inserted in a socket in the slide $m'$ and engaged therewith, so that when the screw is moved endwise by its rotation it will also move the socket endwise. $m^{10}$ represents an adjusting-screw similarly engaged with the standard $m$ and with the slide $m^3$. Said adjusting-screws enable the slides to be moved independetly of each other toward and from the heel-support.

In securing and centering a shoe placed upon the support the slide $m$ is moved by its adjusting-screw to press its head $m^2$ against the median line of the heel portion of the upper, thus causing the inner surface of the upper to bear against the rear end of the heel-support. The slide $m^3$ is then moved by its adjusting-screw in the direction indicated by the arrow in Fig. 11, thus causing the levers $m^4$ by their bearing on the supports $m^7$ to swing inwardly and press the projections $m^6$ against the sides of the upper at points coinciding with the breast of the heel. This operation centers the shoe, so that it occupies the exact predetermined position with relation to the templet and drivers. The projections $m^6$ are preferably pivotally connected to the levers $m^4$ at $m^{12}$, and each projection is preferably curved at its end which bears on the upper, said curved end being preferably reduced to a thin edge in order that it may enter the rand-crease between the upper and sole. The pivotal connection of the projections $m^6$ to the levers $m^4$ enables said projections to yield and swing backwardly while the widest part of the heel is passing between them, the projections being restored to their normal positions after the widest part of the heel has passed by means of springs $m^{13}$, affixed to the levers $m^4$ and bearing on the flat outer ends of the projections $m^6$.

I have provided a holder for temporarily securing the heel to the under surface of the templet prior to the heel-attaching operation, a top-lift holding and spanking device adapted to assume the position occupied by the heel during the heel-attaching operation, so that after the attachment of the heel and its separation from the templet the top lift will be interposed by said device between the templet and heel.

The means shown in Figs. 5, 9, 10, and 11 for holding the heel and top lift as above indicated comprise a slide or spanker plate $o$, adapted to slide across the under side of the templet, a bar $o'$, affixed to one end of said plate, guide-rods $o^2$, affixed to said bar and extending through sockets formed in the templet, said rods and sockets guiding the plate $o$ in its backward and forward movements, hereinafter described, and springs $o^3$ $o^3$, applied to the ends of the bar $o'$ and to studs $o^4$ $o^4$, affixed to the templet, said springs being preferably ordinary rubber bands and arranged to normally move the plate $o$ to the position shown in Figs. 9 and 10, said plate being thus caused to cover the lower ends of the nail holes or pockets in the templet. The front edge of the templet is provided with a downwardly-projecting lip $o^5$, which serves as a stop for the breast of the heel $g$.

The plate $o$ is provided with top-lift-holding devices, consisting in the present case of a lip or flange $o^7$, formed on the forward end of said plate, and a spring $o^6$, attached at one end to the plate and adapted to co-operate with the lip $o^7$ in grasping a top lift $j$, as shown in Fig. 16, the top lift being moved edgewise into the space between the said spring and lip and caused in its movement to displace the spring sufficiently to enable the spring in reacting to hold the breast of the top lift firmly against one side of the lip $o^7$.

In preparing the machine for operation the plate $o$ is pushed back from the portion of the templet containing the nail holes or pockets, as shown in Fig. 5, and the heel-blank $g$ is inserted between the lip $o^5$ and the forward end of the plate $o$, the latter having been supplied with a top lift $j$. The springs $o^3$, exerting a constant pressure on the plate $o$, cause the latter to co-operate with the lip $o^5$ in holding the heel in place on the bottom of the templet while the heel is being attached to the shoe in the manner above described. After the attachment of the heel and its separation from the templet the plate $o$, then having no obstruction to its forward movement, is thrown forward by its springs to the position shown in Fig. 9, the plate being arrested in this position by the lift $o^5$, so that the top lift is held in position to coincide with the heel when the templet is released and forced against the heel by its operating-springs. My invention is not limited, however, to the above-described means for holding the heel on the templet and for presenting and spanking on the top lift.

I have also provided a loading device for quickly loading the templet with nails preparatory to securing each heel. The loading device here shown comprises a nail-holding block $p$, having nail holes or pockets $p'$ arranged to coincide with the holes $f^4$ of the templet, said block being affixed to a slide $p^2$, adapted to move in guides on the head $e$, the drivers $d$ being also affixed to said head, so that when the block $p$ is moved forward over the templet to load the latter with nails the drivers are moved forward out of the way. The nail-holding block $p$ is provided at its under side with a movable plate or cover $p^3$, which is normally held by a spring in position to cover the lower ends of the nail-holes $p'$ and retain the nails therein. To the retaining-plate $p^3$ is pivoted an arm or projection $p^{41}$, which is normally held by a spring $p^5$ in position to strike one of the templet-guiding rods $f'$ (see Figs. 2 and 14) when the slide $p^2$ is moved forward. The contact of the projection $p^{41}$ with said guide-rod forces the plate $p^3$ backwardly and causes the nail-releasing holes $p^{51}$, formed in said plate, to coincide with the nail-pockets $p'$, and thus allow the nails to drop into the pockets of the templet, the nail-releasing movement of the plate $p^3$ occurring just at the point when the pockets $p'$ of the block $p$ are in line with the pockets $f^4$ of the templet.

Fig. 6 shows the relative positions of the templet and block $p$ when the plate $p^3$ is in position to release the nails.

When the drivers are in their operative position, the block $p$ is at the rear of the machine, so that an attendant there located can supply the pockets $p'$ with nails while the heel and top lift are being attached. Hence the operator, after attaching a heel and top lift, can load the templet for the next operation by simply drawing forward the slide $p^2$ until the nails are discharged into the templet. Then by moving said slide back to restore the drivers to their normal position he prepares the machine for operation and puts the block within reach of the attendant who loads it.

It is desirable in a machine organized as in this case to provide means for holding the templet substantially in the position shown in Fig. 5 prior to the operation of attaching a heel, the templet being sufficiently separated from the shoe to permit the ready application of the heel to the templet. To this end I provide the cross-bar $f^2$ with a latch or bar $q$, which is adapted to engage a short arm $q'$ on a shaft $q^2$, journaled in bearings in the fixed head $e$. Said shaft is provided with a handle or lever $q^3$, Figs. 2 and 3, by which it may be turned by the operator. After the templet has been depressed to spank on the top lift and solidify the heel it may be raised from said position to the position shown in Fig. 5 by turning the lever $q^3$ in the direction indicated by the arrow in Fig. 3, thus raising the arm $q'$ and causing the outer end of said arm to engage the latch or bar $q$, and through said latch or bar raise the templet, as shown in Figs. 3 and 5. When the heel-support is raised to attach the heel to the shoe, the templet is additionally raised and the latch or bar $q$ is thus disconnected from the arm $q'$, whereupon said arm is caused by a spring or other suitable means to fall to the position shown in Figs. 8, 9, and 10, so that when the templet descends said arm will not be in position to arrest the latch or bar $q$.

In Figs. 2, 3, and 4 I have shown, as an additional means of moving the arm to its templet-raising position, a segmental pulley $q^4$, to which is attached a cord or strap $q^5$, the lower end of which is connected to a treadle $q^6$, so that the operator may move the arm $q'$ by his foot, if desired.

In Figs. 17 and 18 I show the machine adjusted or organized so that the shoe-support is fixed and the drivers are moved toward and from the support. In this case the cross-head $b$, supporting the shoe-support, is affixed to the supporting-frame by any suitable means, such as bolts $b^3$ on the cross-head entering sockets $b^4$ on the supporting-frame, and the head $e$, supporting the drivers, together with the rods $a'$ $a'$, supporting said head, are adapted to move vertically in guides $u$ $u$ on the supporting-frame, there being no rigid attachment of the rods to the supporting-frame. The templet is supported by the head $e$, as in the construction previously described, and moves downwardly with the said head when the drivers are being depressed, the downward movement of the templet being arrested by the contact of the heel with the heel-support, while the drivers and head continue to move downwardly after the templet has stopped. The templet-springs are therefore extended or set and the templet is locked to maintain the springs in their extended condition by the detent $i$. The detent is displaced during the upward movement of the drivers after the top lift has been inserted, the operation being in all respects the same as that already described, excepting that the drivers and not the shoe-support are moved to drive the nails and cause the spanking on of the top lift.

My invention differs from all previously-known heel-nailing machines in that all the operations involved in nailing on the heel and top lift are performed by a single cycle of movements of the machine, or, in other words, by the series of movements that take place during one rotation of the driving-shaft in a power-machine and during the depression and return of the operating-treadle in a machine not driven by power, so that the entire operation is performed in a shorter period than in any other machine known to me.

The fact that all the steps of the heel and top lift attaching operation can be accomplished during one cycle of movements is due, first, to the arrangement of the drivers and shoe-support in line with the point occupied by the heel and top lift, there being no lateral movement of either the shoe-support or drivers from said line during the operation; secondly, to the successive occupancy of said point by the heel and top lift, so that all the pressure that causes the attachment of the heel and top lift is exerted along said line, and, thirdly, to the separation of the attached heel from the templet prior to the insertion of the top lift and the bringing together of the heel and top lift after the top-lift spanker has been moved into line with the attached heel and its support.

The spring-actuated templet set for action by the operation of attaching the heel constitutes the best means known to me for causing the co-operation of the top-lift spanker and shoe-support, which spanks on the top lift, the abrupt blow given by the templet being sufficient to drive the top lift onto the nails and solidify the heel without exerting a crushing force on the shoe-support. Hence said templet, acting as a hammer, is well adapted for use with wooden lasts, as before stated.

I do not limit myself to the use of actuating-springs in connection with the templet, but may instead make the templet of such weight that it will act by gravity alone as a drop-hammer.

It is obvious that the heels employed may be compressed and charged with nails before their application to the machine, the nails projecting from the heel and being inserted in the holes of the templet when the heel is placed in its holder, in which case the loading devices above described for discharging nails into the templet would not be required.

I claim—

1. In a heel-nailing machine, the combination of a heel-support, a gang of drivers, an intermediate templet, and top-lift carrier, with mechanism, substantially as described, for attaching the heel and then causing the separation of the attached heel from the templet, and a simultaneously-operated tripping device, and mechanism for throwing the top-lift carrier into position and spanking on the top lift, all by a practically continuous stroke of the cross-head or cycle of movements of the machine, substantially as described.

2. In a heel-nailing machine, the combination of a heel-support, a gang of drivers, an intermediate templet, heel-holder, and top-lift carrier, with mechanism, substantially as described, for attaching the heel and then causing the separation of the attached heel from the templet and then moving the heel-holder out of the way, and a simultaneously-operated tripping device, and mechanism for throwing the top-lift carrier into position and spanking on the top lift, all during a single cycle of movements of the machine, substantially as described.

3. In a heel-attaching machine, the combination of a shoe-support and a gang of drivers, one of said members having a heel-attaching movement toward the other, a templet interposed between said members and adapted to be set or adjusted by said heel-attaching movement to give a top-lift-attaching blow, a latch or detent whereby the templet is arrested in its adjusted position, a heel-holder adapted to hold a heel in operative relation to the templet preparatory to the heel-attaching movement of the movable member, a top-lift holder, and spanker which is interchangeable in position with the heel-holder, whereby a top lift may be presented to the templet to be attached by the blow of the latter, and connections for operating each of said parts during a single advance and retraction of said movable member, as set forth.

4. In a heel-attaching machine, the combination of a shoe-support and a gang of drivers, one of said members having a heel-attaching movement toward the other, a templet interposed between said members and adapted to be set or adjusted by said heel-attaching movement to give a top-lift-attaching blow, a latch or detent whereby the templet is arrested in its adjusted position, a heel-holder adapted to hold a heel in operative relation to the templet preparatory to the heel-attaching movement of the movable member, a top-lift holder, and spanker which is adapted to present a top lift to the templet while the latter is arrested by the detent, automatic means for displacing the latch or detent and thereby releasing the templet, and connections for operating each of said parts during a single advance and retraction of said movable member, as set forth.

5. The combination of a gang of drivers, a shoe-support movable toward and from said drivers, a movable templet interposed between the drivers and support and yieldingly pressed toward the support, means for moving the support to cause it to force the templet and a heel interposed between the support and templet toward the drivers, whereby the drivers are caused to force the nails from the templet into the heel, and a latch or detent constructed substantially as described and adapted to arrest the templet at the end of the movement imparted to it by the support, whereby time is afforded for the separation of the heel from the templet by the opposite movement of the support and the interposition of a top lift between the templet and heel, the templet being set for acting by said movement, so that when the latch or detent is moved to release the templet the latter will force the top lift to place and solidify the heel, as set forth.

6. The combination of a gang of drivers, a shoe-support movable toward and from said drivers, a yielding templet interposed between the drivers and support and adapted to be displaced from its normal position by the movement of the support toward the drivers, said movement causing the drivers to force the nails from the templet into a heel interposed between the templet and support, a latch or detent constructed substantially as described and adapted to arrest the templet at the end of the movement imparted to it by the support, whereby time is afforded for the separation of the heel from the templet by the retreating movement of the support, the templet being set for action by said movement, and automatic means for displacing the latch or detent and thereby releasing the templet, as set forth.

7. In a heel-nailing machine, the combination of a movable shoe-support, a movable templet arranged in the path of movement of the shoe-support, a slide or carrier mounted in fixed guides on the supporting-frame and movable in a direction at right angles to the movement of the shoe-support and templet, a gang of drivers attached to one end of said slide or carrier, a nail block or loader attached to the opposite end of said slide or carrier, said loader and drivers being rigidly and positively connected by the slide or carrier and adapted by the movement of the latter to be placed alternately in line with the templet and shoe-support, and means for releasing the nails from the loader and permitting their discharge into the templet when the loader is in operative position, as set forth.

8. In a heel-nailing machine, the combination, with a heel-support, a gang of drivers, an intermediate templet and top-lift carrier, and connections for operating said parts, as described, of a shoe-centering device comprising an adjustable block or head adapted to bear on the rear portion of a shoe on said support, two longitudinally and laterally movable arms arranged to bear on opposite sides of the shoe, and means for adjusting said arms to the width of the portions of the shoe with which they are engaged, as set forth.

9. The combination, with a shoe-support, of a shoe-centering device comprising in its construction two independently-adjustable slides, a block affixed to one of said slides and adapted to bear on the rear portion of a shoe, a pair of arms each pivotally connected at one end to the other slide, the other ends of said arms being arranged to bear on opposite sides of the shoe, fixed supports on which the outer edges of said arms bear, and means for adjusting said slides, as set forth.

10. A heel-attaching machine comprising in its construction a shoe-support, a gang of drivers adapted to co-operate with said support in attaching a heel to a shoe on the support, a nail-holding templet interposed between the support and drivers and adapted to be set or adjusted for an additional or top-lift-attaching action by the operative movement which causes the attachment of the heel to the shoe, and an independent device, such as a spring, to force the templet toward the shoe-support and cause the templet to attach the top lift, as set forth.

11. In a heel-nailing machine, the combination, with a heel-support, a gang of drivers, an intermediate templet and top-lift carrier, and connections for operating said parts, as described, of a gage for the rear of the heel part of the shoe, side gages, and means to adjust and proportion the distance between the side gages definitely with relation to the rear gage, as and for the purposes set forth.

12. In a heel-attaching machine, a shoe-support, a templet movable relative thereto, a nail-block provided with recesses or pockets for the nails and a gang of drivers both carried by a single support, and mechanism for bringing the said nail-block and drivers interchangeably into operative position with relation to the templet, as required, for the purpose set forth.

In testimony whereof I have signed my name to this specification, in the presence of two subscribing witnesses, this 8th day of October, A. D. 1891.

HAROLD A. WEBSTER.

Witnesses:
C. F. BROWN,
A. D. HARRISON.